(12) United States Patent
Jin et al.

(10) Patent No.: US 8,161,351 B2
(45) Date of Patent: Apr. 17, 2012

(54) SYSTEMS AND METHODS FOR EFFICIENT DATA STORAGE

(75) Inventors: Ming Jin, Fremont, CA (US); Shaohua Yang, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 74 days.

(21) Appl. No.: 12/750,654

(22) Filed: Mar. 30, 2010

(65) Prior Publication Data

US 2011/0246856 A1    Oct. 6, 2011

(51) Int. Cl.
*H03M 13/00* (2006.01)
(52) U.S. Cl. ........................................ 714/758
(58) Field of Classification Search ............. 714/758, 714/763
See application file for complete search history.

(56) References Cited

U.S. PATENT DOCUMENTS

| | | |
|---|---|---|
| 5,182,682 A | 1/1993 | Weispfenning et al. |
| 5,278,703 A | 1/1994 | Rub |
| 5,278,846 A | 1/1994 | Okayama et al. |
| 5,325,402 A | 6/1994 | Ushirokawa |
| 5,392,299 A | 2/1995 | Rhines et al. |
| 5,471,500 A | 11/1995 | Blaker et al. |
| 5,513,192 A | 4/1996 | Janku et al. |
| 5,523,903 A | 6/1996 | Hetzler |
| 5,550,870 A | 8/1996 | Blaker et al. |
| 5,612,964 A | 3/1997 | Haraszti |
| 5,701,314 A | 12/1997 | Armstrong et al. |
| 5,710,784 A | 1/1998 | Kindred et al. |
| 5,712,861 A | 1/1998 | Inoue et al. |
| 5,717,706 A | 2/1998 | Ikeda |
| 5,768,044 A | 6/1998 | Hetzler |
| 5,802,118 A | 9/1998 | Bliss et al. |
| 5,818,654 A | 10/1998 | Reddy et al. |
| 5,844,945 A | 12/1998 | Nam et al. |
| 5,898,710 A | 4/1999 | Amrany |
| 5,923,713 A | 7/1999 | Hatakeyama |
| 5,978,414 A | 11/1999 | Nara |
| 5,983,383 A | 11/1999 | Wolf |
| 5,999,110 A * | 12/1999 | Blaum et al. .................. 341/59 |
| 6,005,897 A | 12/1999 | McCallister et al. |
| 6,023,783 A | 2/2000 | Divsalar et al. |
| 6,029,264 A | 2/2000 | Kobayashi et al. |
| 6,041,432 A | 3/2000 | Ikeda |
| 6,065,149 A | 5/2000 | Yamanaka |
| 6,097,764 A | 8/2000 | McCallister et al. |
| 6,145,110 A | 11/2000 | Khayrallah |

(Continued)

FOREIGN PATENT DOCUMENTS

EP    0522578    1/1993

(Continued)

OTHER PUBLICATIONS

U.S. Appl. No. 11/461,026, filed Jul. 31, 2006, Tan, Weijun.

(Continued)

*Primary Examiner* — James C Kerveros
(74) *Attorney, Agent, or Firm* — Hamilton DeSanctis & Cha (57) ABSTRACT

Various embodiments of the present invention provide systems and methods for preparing and accessing super sector data sets. As an example, a data storage system including a storage medium is disclosed. The storage medium includes a first servo data region and a second servo data region separated by a user data region. The user data region includes at least a portion of a first codeword and a portion of a second codeword that are together associated with a common header data.

26 Claims, 7 Drawing Sheets

U.S. PATENT DOCUMENTS

| | | |
|---|---|---|
| 6,216,249 B1 | 4/2001 | Bliss et al. |
| 6,216,251 B1 | 4/2001 | McGinn |
| 6,229,467 B1 | 5/2001 | Eklund et al. |
| 6,266,795 B1 | 7/2001 | Wei |
| 6,317,472 B1 | 11/2001 | Choi et al. |
| 6,351,832 B1 | 2/2002 | Wei |
| 6,377,610 B1 | 4/2002 | Hagenauer et al. |
| 6,381,726 B1 | 4/2002 | Weng |
| 6,438,717 B1 | 8/2002 | Butler et al. |
| 6,473,878 B1 | 10/2002 | Wei |
| 6,476,989 B1 | 11/2002 | Chainer et al. |
| 6,625,775 B1 | 9/2003 | Kim |
| 6,657,803 B1 | 12/2003 | Ling et al. |
| 6,667,701 B1 * | 12/2003 | Tao .................. 341/67 |
| 6,671,404 B1 | 12/2003 | Katawani et al. |
| 6,748,034 B2 | 6/2004 | Hattori et al. |
| 6,757,862 B1 | 6/2004 | Marianetti |
| 6,785,863 B2 | 8/2004 | Blankenship et al. |
| 6,788,654 B1 | 9/2004 | Hashimoto et al. |
| 6,810,502 B2 | 10/2004 | Eidson |
| 6,980,382 B2 | 12/2005 | Hirano et al. |
| 6,986,098 B2 | 1/2006 | Poeppelman et al. |
| 7,010,051 B2 | 3/2006 | Murayama et al. |
| 7,047,474 B2 | 5/2006 | Rhee et al. |
| 7,058,873 B2 | 6/2006 | Song et al. |
| 7,073,118 B2 | 7/2006 | Greenberg et al. |
| 7,093,179 B2 | 8/2006 | Shea |
| 7,113,356 B1 | 9/2006 | Wu |
| 7,173,783 B1 | 2/2007 | McEwen et al. |
| 7,184,486 B1 | 2/2007 | Wu et al. |
| 7,191,378 B2 | 3/2007 | Eroz et al. |
| 7,203,015 B2 | 4/2007 | Sakai et al. |
| 7,203,887 B2 | 4/2007 | Eroz et al. |
| 7,236,757 B2 | 6/2007 | Raghavan et al. |
| 7,257,764 B2 | 8/2007 | Suzuki et al. |
| 7,310,768 B2 | 12/2007 | Eidson et al. |
| 7,313,750 B1 | 12/2007 | Feng et al. |
| 7,370,258 B2 | 5/2008 | Iancu et al. |
| 7,403,752 B2 | 7/2008 | Raghavan et al. |
| 7,430,256 B2 | 9/2008 | Zhidkov |
| 7,502,189 B2 | 3/2009 | Sawaguchi et al. |
| 7,505,537 B1 | 3/2009 | Sutardja |
| 7,523,375 B2 | 4/2009 | Spencer |
| 7,587,657 B2 | 9/2009 | Haratsch |
| 7,590,168 B2 | 9/2009 | Raghavan et al. |
| 7,590,914 B2 * | 9/2009 | Kim et al. .................. 714/752 |
| 7,702,989 B2 | 4/2010 | Graef et al. |
| 7,712,008 B2 | 5/2010 | Song et al. |
| 7,801,200 B2 | 9/2010 | Tan |
| 7,802,163 B2 | 9/2010 | Tan |
| 7,831,887 B2 * | 11/2010 | Joyce et al. .................. 714/758 |
| 2002/0073270 A1 | 6/2002 | Bereznak et al. |
| 2003/0063405 A1 | 4/2003 | Jin et al. |
| 2003/0081693 A1 | 5/2003 | Raghaven et al. |
| 2003/0087634 A1 | 5/2003 | Raghaven et al. |
| 2003/0112896 A1 | 6/2003 | Raghaven et al. |
| 2003/0134607 A1 | 7/2003 | Raghaven et al. |
| 2004/0071206 A1 | 4/2004 | Takatsu |
| 2004/0098659 A1 | 5/2004 | Bjerke et al. |
| 2005/0010855 A1 | 1/2005 | Lusky |
| 2005/0078399 A1 | 4/2005 | Fung |
| 2005/0111540 A1 | 5/2005 | Modrie et al. |
| 2005/0157780 A1 | 7/2005 | Werner et al. |
| 2005/0195749 A1 | 9/2005 | Elmasry et al. |
| 2005/0216819 A1 | 9/2005 | Chugg et al. |
| 2005/0273688 A1 | 12/2005 | Argon |
| 2006/0020872 A1 | 1/2006 | Richardson et al. |
| 2006/0031630 A1 | 2/2006 | Batchelor et al. |
| 2006/0031737 A1 | 2/2006 | Chugg et al. |
| 2006/0123285 A1 | 6/2006 | De Araujo et al. |
| 2006/0140311 A1 | 6/2006 | Ashley et al. |
| 2006/0168493 A1 | 7/2006 | Song |
| 2006/0195772 A1 | 8/2006 | Graef et al. |
| 2006/0248435 A1 | 11/2006 | Haratsch |
| 2006/0256670 A1 | 11/2006 | Park et al. |
| 2007/0011569 A1 | 1/2007 | Casado et al. |
| 2007/0047635 A1 | 3/2007 | Stojanovic et al. |
| 2007/0110200 A1 | 5/2007 | Mergen et al. |
| 2007/0230407 A1 | 10/2007 | Petrie et al. |
| 2007/0234117 A1 | 10/2007 | Elliott et al. |
| 2007/0286270 A1 | 12/2007 | Huang et al. |
| 2008/0049825 A1 | 2/2008 | Chen et al. |
| 2008/0055122 A1 | 3/2008 | Tan |
| 2008/0065970 A1 | 3/2008 | Tan |
| 2008/0069373 A1 | 3/2008 | Jiang et al. |
| 2008/0095074 A1 * | 4/2008 | Kwon et al. .................. 370/255 |
| 2008/0168330 A1 | 7/2008 | Graef et al. |
| 2009/0199071 A1 | 8/2009 | Graef |
| 2009/0235116 A1 | 9/2009 | Tan et al. |
| 2009/0235146 A1 | 9/2009 | Tan et al. |
| 2009/0259915 A1 | 10/2009 | Livshitz et al. |
| 2009/0273492 A1 | 11/2009 | Yang et al. |
| 2009/0274247 A1 | 11/2009 | Galbraith et al. |
| 2010/0002795 A1 | 1/2010 | Raghavan et al. |
| 2010/0061492 A1 | 3/2010 | Noeldner |
| 2010/0070837 A1 | 3/2010 | Xu et al. |
| 2010/0164764 A1 | 7/2010 | Nayak |
| 2010/0185914 A1 | 7/2010 | Tan et al. |

FOREIGN PATENT DOCUMENTS

| | | |
|---|---|---|
| EP | 0631277 | 12/1994 |
| EP | 1814108 | 8/2007 |
| WO | WO 2006/016751 | 2/2006 |
| WO | WO 2006/134527 | 12/2006 |
| WO | WO 2007/091797 | 8/2007 |

OTHER PUBLICATIONS

U.S. Appl. No. 11/461,198, filed Jul. 31, 2006, Tan, Weijun.
U.S. Appl. No. 11/461,283, filed Jul. 31, 2006, Tan, Weijun.
U.S. Appl. No. 12/540,283, filed Aug. 12, 2009, Liu, et al.
U.S. Appl. No. 12/652,201, filed Jan. 5, 2010, Mathew, et al.
U.S. Appl. No. 12/763,050, filed Apr. 19, 2010, Ivkovic, et al.
U.S. Appl. No. 12/792,555, filed Jun. 2, 2101, Liu, et al.
U.S. Appl. No. 12/887,330, filed Sep. 21, 2010, Zhang, et al.
U.S. Appl. No. 12/887,369, filed Sep. 21, 2010, Liu et al.
U.S. Appl. No. 12/901,816, filed Oct. 11, 2010, Li et al.
U.S. Appl. No. 12/917,756, filed Nov. 2, 2010, Miladinovic et al.
U.S. Appl. No. 12/947,931, filed Nov. 17, 2010, Yang, Shaohua.
U.S. Appl. No. 12/947,947, filed Nov. 17, 2010, Ivkovic et al.
U.S. Appl. No. 12/972,942, filed Dec. 20, 2010, Liao et al.
Casado et al., Multiple-rate low- denstiy parity-check codes with constant blocklength, IEEE Transations on communications, Jan. 2009, vol. 57, pp. 75-83.
Collins and Hizlan, "Determinate State Convolutional Codes" IEEE Transactions on Communications, Dec. 1993.
Eleftheriou, E. et al., "Low Density Parity-Check Codes for Digital Subscriber Lines", Proc ICC 2002, pp. 1752-1757.
Fisher, R et al., "Adaptive Thresholding"[online] 2003 [retrieved on May 28, 2010] Retrieved from the Internet <URL:http://homepages.inf.ed.ac.uk/rbf/HIPR2/adpthrsh.htm.
Fossnorier, Marc P.C. "Quasi-Cyclic Low-Density Parity-Check Codes From Circulant Permutation Maricies" IEEE Transactions on Information Theory, vol. 50, No. 8 Aug. 8, 2004.
Gunnam, K et al. "Tech. Note on Iterative LDPC Solutions for Turbo Equal.", K. Gunnam, G. Choi and M. Yeary, TX A&M Tech. Note, Rpt. Dt: Jul. 2006 Avail. online dropzone.tamu.edu.
K. Gunnam et al., "Next Generation iterative LDPC solutions for magnetic recording storage, "invited paper. The Asilomar Conference on Signals, Systems, and Computers, Nov. 2008.
Han and Ryan, "Pinning Techniques for Low-Floor Detection/Decoding of LDPC-Coded Partial Response Channels", 5th International Symposium on Turbo Codes &Related Topics, 2008.
Lee et al., "Partial Zero-Forcing Adaptive MMSE Receiver for DS-CDMA Uplink in Multicell Environments" IEEE Transactions on Vehicular Tech. vol. 51, No. 5, Sep. 2002.
Mohsenin et al., "Split Row: A Reduced Complexity, High Throughput LDPC Decoder Architecture", pp. 1-6, printed from www.ece.ucdavis.edu on Jul. 9, 2007.
Sari H et al., "Transmission Techniques for Digital Terrestrial TV Broadcasting" IEEE Communications Magazine, IEEE Service Center Ny, NY vol. 33, No. 2 Feb. 1995.

Unk, "Auto threshold and Auto Local Threshold" [online] [retr. May 28, 2010] Retr. from the Internet www.dentristy.bham.ac.uk/landinig/software/autothreshold/autothreshold.html.

Vasic, B., "High-Rate Low-Density Parity-Check Codes Based on Anti-Pasch Affine Geometries," Proc ICC 2002, pp. 1332-1336.

Vasic, B., "High-Rate Girth-Eight Codes on Rectangular Integer Lattices", IEEE Trans. Communications, vol. 52, Aug. 2004, pp. 1248-1252.

Wang Y et al., "A Soft Decision Decoding Scheme for Wireless COFDM With App. to DVB-T" IEEE Transactions on Consumer elect., IEEE Service Center, NY,NY vo. 50, No. 1 Feb. 2004.

Weon-Cheol L. et al., "Vitierbi Decoding Method Using Channel State Information in COFDM System" IEEE Trans. on Consumer Elect., IEEE Service Center, NY, NY vol. 45 No. 3 Aug. 1999.

Yeo et al., "VLSI Architecture for Iterative Decoders in Magnetic Storage Channels", Mar. 2001, pp. 748-755, IEEE trans. Magnetics, vol. 37, No. 2.

Youn, "BER Perf. Due to Irreg. of Row-Weoght Distr. of the Parity-Check Matirx in Irregular LDPC Codes for 10-Gb/s Optical Signals" Journal of Lightwave Tech., vol. 23 Sep. 9, 2005.

Zhong et al., "Area-Efficient Min-Sum Decoder VLSI Architecture for High-Rate QC-LDPC Codes in Magnetic Recording", pp. 1-15, Submitted 2006, not yet published.

Zhong, "Block-LDPC: A Practical LDPC Coding System Design Approach", IEEE Trans. on Circuits, Regular Papers, vol. 5, No. 4, pp. 766-775, Apr. 2005.

Zhong et al., "Design of VLSI Implementation-Oriented LDPC Codes", IEEE, pp. 670-673, 2003.

Zhong et al., "High-Rate Quasi-Cyclic LDPC Codes for Magnetic Recording Channel with Low Error Floor", ISCAS, IEEE pp. 3546-3549, May 2006.

Zhong et al., "Iterative MAX-LOG-MAP and LDPC Detector/Decoder Hardware Implementation for Magnetic Read Channel", SRC Techron, pp. 1-4, Oct. 2005.

Zhong et al., "Joint Code-Encoder Design for LDPC Coding System VLSI Implementation", ISCAS, IEEE pp. 389-392, May 2004.

Zhong et al., "Quasi Cyclic LDPC Codes for the Magnetic Recording Channel: Code Design and VSLI Implementation", IEEE Transactions on Magnetics, v. 43, pp. 1118-1123, Mar. 2007.

Zhong, "VLSI Architecture of LDPC Based Signal Detection and Coding System for Magnetic Recording Channel", Thesis, RPI, Troy, NY, pp. 1-95, May 2006.

* cited by examiner

SYSTEMS AND METHODS FOR EFFICIENT DATA STORAGE

BACKGROUND OF THE INVENTION

The present inventions are related to storing data, and more particularly to formats, systems and methods for storing data to a storage medium.

A read channel integrated circuit is a component of a magnetic storage device. In operation, a read channel component converts and encodes data to enable a read/write head assembly to write data to a disk and to subsequently read data back. In, for example, a hard disk drive, the disk typically includes many tracks containing encoded data that extend around the disk in a radial pattern. Each track includes one or more user data regions as well as intervening servo data regions. The information of the servo data regions is used to position the read/write head assembly in relation to the disks so that the information stored in the user data regions may be retrieved accurately.

Figure 1:
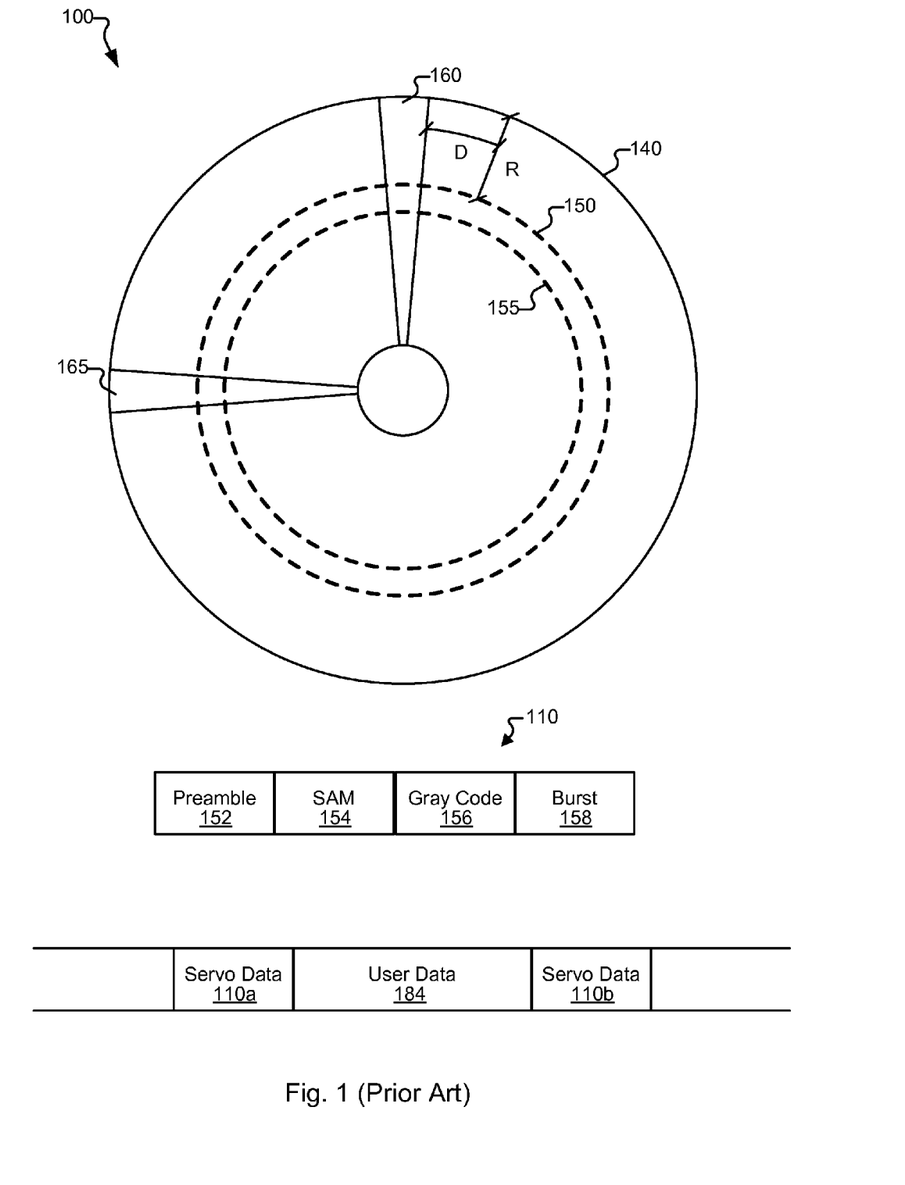
FIG. 1 depicts an existing storage medium including servo data.

FIG. 1 shows a storage medium 100 with two exemplary tracks 150, 155 indicated as dashed lines. The tracks are segregated by servo data written within wedges 160, 165. These wedges include data and supporting bit patterns 110 that are used for control and synchronization of the read/write head assembly over a desired location on storage medium 100. In particular, these wedges generally include a preamble pattern 152 followed by a sector address mark 154 (SAM). Sector address mark 154 is followed by a Gray code 156, and Gray code 156 is followed by burst information 158. It should be noted that while two tracks and two wedges are shown, hundreds of each would typically be included on a given storage medium. Further, it should be noted that a servo data set may have two or more fields of burst information. Between the bit patterns 110, a user data region 184 is provided. Such user data regions 184 include substantial overhead and wasted areas resulting in a reduction in the density of data maintained in the user data region 184.

Hence, for at least the aforementioned reasons, there exists a need in the art for advanced systems and methods for maintaining data on a storage medium.

BRIEF SUMMARY OF THE INVENTION

The present inventions are related to storing data, and more particularly to formats, systems and methods for storing data to a storage medium.

Various embodiments of the present invention provide data storage systems that include a storage medium. The storage medium includes a first servo data region and a second servo data region separated by a user data region. The user data region includes at least a portion of a first codeword and a portion of a second codeword that are together associated with a common header data. In some instances, the first codeword and the second codeword are low density parity check encoded codewords. In various instances of the aforementioned embodiments, the portion of the first codeword is all of the first codeword, and the portion of the second codeword is less than all of the second codeword. In such a case, the remaining part of the second codeword is included in another user data region.

In some cases, the data storage system further includes an encoder circuit operable to: receive write data; encode the write data into the first codeword and the second codeword; and combine the portion of the first codeword with the portion of the second codeword and the common header data to form a super sector data set. In some such cases, the encoder circuit includes a low density parity check encoder, and the first codeword and the second codeword are low density parity check encoded codewords. In one or more such cases, the encoder circuit further includes a user data region matching circuit that is operable to combine the portion of the first codeword with the portion of the second codeword and the common header data into the super sector data set. In particular cases, the super sector data set includes greater than two times the number of bit periods in the first codeword, and less than the number of bit periods of the user data region.

In one or more cases, the portion of a first codeword, the portion of a second codeword and the common header data are assembled in a super sector data set. The systems further include a decoder circuit operable to: receive the super sector data set; synchronize to the super sector data set using the common header data; divide the super sector data set to yield the portion of the first codeword and the portion of the second codeword; and decode the first codeword and the second codeword to yield the write data. In some such cases, the decoder circuit includes a low density parity check decoder, and the first codeword and the second codeword are low density parity check encoded codewords.

Other embodiments of the present invention provide data decoder circuits having a codeword boundary matching circuit and a data processing circuit. The codeword boundary matching circuit is operable to: receive a super sector data set having a first codeword, a second codeword and a common header data; and divide the super sector data set to yield the first codeword and the second codeword. The data processing circuit operable to: apply a decoding algorithm to the first codeword to yield a first data set, and apply the decoding algorithm to the second codeword to yield a second data set. In some cases, the first codeword and the second codeword are low density parity check encoded data, and the data processing circuit includes a low density parity check decoder circuit.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several drawings to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present inventions are related to storing data, and more particularly to formats, systems and methods for storing data to a storage medium.

Various embodiments of the present invention provide improved format efficiency for user data maintained on a storage medium. Such embodiments provide for concatenating codewords into a super sector data set that is stored to a storage medium. As used herein, the phrase "super sector data set" is used in its broadest sense to mean a data set that includes more than one codeword assembled together with a common header data. Such concatenation, among other things, reduces the amount of overhead associated with maintaining data on a storage medium. Various instances of the aforementioned embodiments support split codewords allowing for utilization of orphan regions of a storage medium. In one particular instance of the aforementioned embodiments, a single preamble field and synchronization pattern is included in each user data region to synchronize to the data maintained in the user data region. As such, only a single preamble and synchronization pattern may be used to synchronize to multiple codewords within the user data region. The data received from the user data region is re-assembled into codewords for processing by a read channel circuit.

Figure 2:
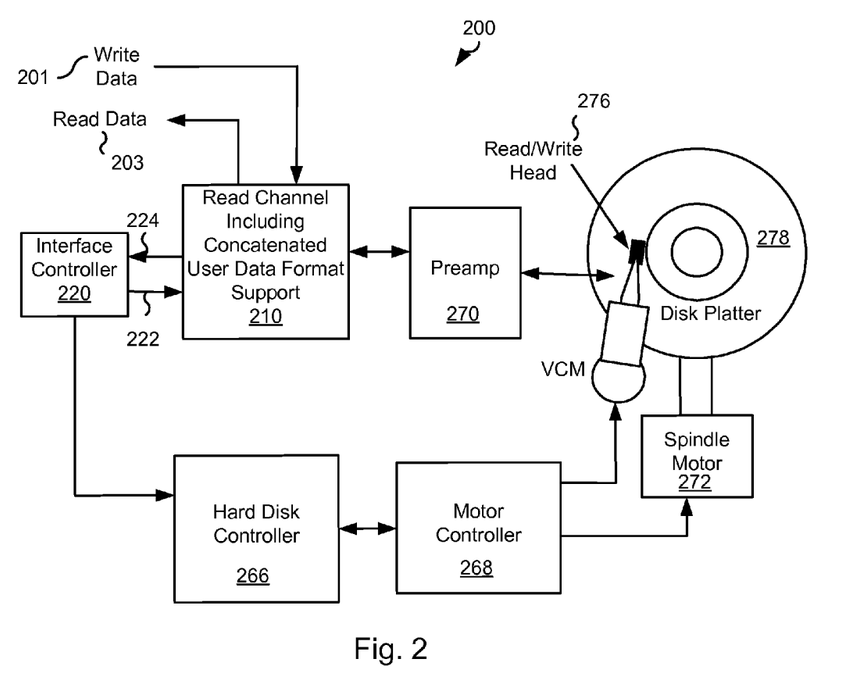
FIG. 2 depicts a storage device including a read channel capable of reading and writing a concatenated user data set in accordance with one or more embodiments of the present invention.

Turning to FIG. 2, a storage system 200 including a read channel 210 with support for concatenated user data is depicted in accordance with various embodiments of the present invention. Storage system 200 may be, for example, a hard disk drive. Read channel 210 may include support for concatenated user data (i.e., super data sets) consistent with that discussed below in relation to FIG. 3, and/or may operate consistent with one or more of FIGS. 4-5. Further, read channel 210 includes a data detector, such as, for example, a Viterbi algorithm data detector. In addition to read channel 210, storage system 200 includes a preamplifier 270 that amplifies a minute electrical signal received from a read/write head assembly 276. Read/write head assembly 276 is disposed in relation to a disk platter 278. Storage system 200 also includes an interface controller 220, a hard disk controller 266, a motor controller 268, and a spindle motor 272. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with a perpendicular recording scheme. In other embodiments of the present invention, disk platter 278 includes magnetic signals recorded in accordance with a longitudinal recording scheme.

In a typical read operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel 210 via preamplifier 270. Preamplifier 270 is operable to amplify the minute analog signals accessed from disk platter 278. In turn, read channel 210 decodes and digitizes the received analog signal to recreate the information originally written to disk platter 278. This data is provided as read data 203 to a receiving circuit. A write operation is substantially the opposite of the preceding read operation with write data 201 being provided to read channel module 210. This data is then encoded and written to disk platter 278.

Figure 3A:
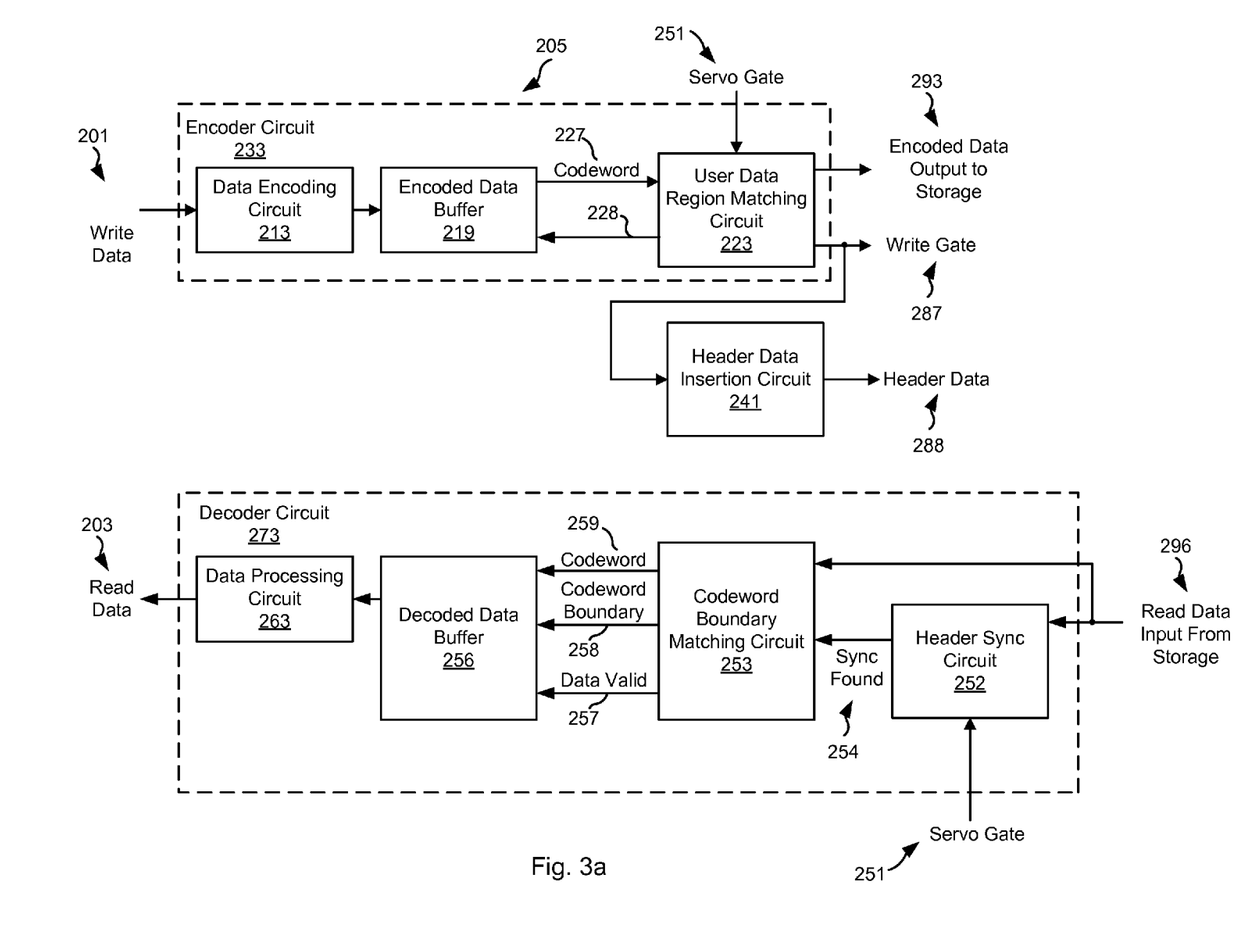
FIG. 3a depicts a read channel circuit operable to read and write concatenated user data sets in accordance with various embodiments of the present invention.

Turning to FIG. 3a, a read channel circuit 205 that is operable to read and write concatenated user data sets (i.e., super sector data sets) is shown in accordance with various embodiments of the present invention. Read channel circuit 205 includes an encoder circuit 233 and a decoder circuit 273. Encoder circuit 233 includes a data encoding circuit 213, an encoded data buffer 219, and a user data region matching circuit 223. Write data 201 is provided to data encoding circuit 213. Write data 201 may be received from any data source known in the art, and may be received either via a parallel data bus or via a serial data bus as are known in the art. In one particular embodiment of the present invention, write data 201 is received from an upstream processor (not shown). Write data 201 is assembled by data encoding circuit 213 into codewords that are provided to encoded data buffer 219. In one particular embodiment, data encoding circuit 213 is a low density parity check (LDPC) encoder circuit as are known in the art. In such embodiments, data encoding circuit 213 provides a series of LDPC codewords to encoded data buffer 219. Such LDPC codewords include portions of write data 201 along with various encoding information as are known in the art. As a particular example, the codewords may each be four thousand, ninety six user bits plus a number of encoding bits (e.g., parity bits). In some cases, the number of encoding bits may be between forty and four hundred depending upon the robustness of the encoding that is performed.

Encoded data buffer 219 may be any data storage device capable of storing the produced codewords from data encoding circuit 213 until the codewords can be processed and written to a storage medium. As an example, encoded data buffer 219 may be a first in, first out memory that provides portions of stored codewords via a codeword interface 227 to user data region matching circuit 223 upon assertion of a request signal 228.

User data region matching circuit 223 is operable to assemble two or more codewords into a super sector data set that is provided as an encoded data output 293 to a storage medium. Encoded data output 293 is provided after write gate signal 287 has been asserted sufficient time for a header data 388 to be written to the storage medium. A header data insertion circuit 241 provides header data 288 one bit at a time during a header period that directly precedes the writing of encoded data output 293 to the storage medium. Header data 288 may be any header data known in the art. Providing header data 288 directly preceding encoded data output 293 is controlled based upon assertion of write gate 293. Header data 288 becomes part of the super sector data set written to the storage medium. In one particular embodiment of the present invention, header data 288 includes a preamble and synchronization field that may be used to identify the beginning of the user data and to synchronize to the super sector data set upon read back from the storage medium. Based upon the disclosure provided herein, one of ordinary skill in the art will recognize a variety of header data that may be used in relation to different embodiments of the present invention.

The number of codewords and portions of codewords assembled into the super sector data set may be matched to the size of the user data region of the storage medium. The following equation represents the amount of data incorporated in the super sector data set:

$$\text{Number of Codewords} = \frac{\text{Size of User Data Region} - \text{Size of Header Data}}{\text{Size of Codewords}}.$$

As an example, where the super sector data set ended on a codeword boundary for the last user data region, the size of the user data region is ten thousand, seven hundred fifty bits, the size of the header data is one hundred bits, and the size of the codewords is four thousand, ninety six bits, the number of codewords calculated by the preceding equation is 2.6. In this case, the succeeding super sector data set starts with the header data followed by the next two complete codewords available from encoded data buffer 219, and a portion of the next codeword from encoded data buffer 219 equivalent to 0.6 of the codeword. The remaining portion (i.e., the last 0.4 codeword) of the partial codeword is written after the header data in the succeeding super sector data set.

User data region matching circuit 223 receives a servo gate signal 251 from a servo data processing circuit (not shown) that indicates the location of a user data region relative to intervening servo data regions. Once the super sector data set is assembled as discussed above and servo gate signal 251 indicates the beginning of the user data region, user data region matching circuit 223 asserts a write gate signal 287 and serially provides the assembled super sector data set one bit at a time via encoded data output 293. This information is provided to a write circuit (not shown) that is responsible for writing the data to the incorporated storage medium.

Decoder circuit 273 includes a header synchronization circuit 252, a codeword boundary matching circuit 253, a decoded data buffer 256, and a data processing circuit 263. Header synchronization circuit 252 receives a read data input 296 derived from the storage medium, and synchronizes to the frequency and phase of the received data stream using the preamble and synchronization information included in the header data associated with the received data. This attempt to synchronize begins when servo gate signal 251 indicates that the servo data region has ended and the user data region has begun. Upon synchronizing to the received data stream, header synchronization circuit 252 asserts a sync found signal 254 indicating that the data received via read data input 296 is valid user data. Header synchronization circuit 252 may be any circuit known in the art that is capable of synchronizing to a data set derived from a user data region of a storage medium, and asserting a data available indicator signal.

Codeword boundary matching circuit 253 receives read gate input 254 and read data input 296, and based thereon assembles the received data into full codewords. Thus, for example, where the end of a user data region includes the first portion of a codeword, codeword boundary matching circuit 253 waits to receive the second portion of the codeword from the beginning of the succeeding user data region before providing the completed codeword. Codeword boundary matching circuit 253 uses the information provided via indicator 297 from codeword concatenation table circuit 283 to identify the location of codewords within the data provided via read data input 296. In some implementations, one or more counters synchronized to sync found signal 254 are used to count bits of codewords and codeword portions derived from a given user data region.

Codeword boundary matching circuit 253 provides codewords or portions of codewords to decoded data buffer 256, along with a codeword boundary signal 258 indicating a separation between codewords and a data valid signal 257 that is used to indicate that data on any given clock cycle is valid. The combination of these signals are used to write assembled codewords in decoded data buffer 256. Based upon the disclosure provided herein, one of ordinary skill in the art will recognize other interfaces that may be used to transfer data from codeword boundary matching circuit 253. Decoded data buffer 256 may be any data storage device capable of storing the codewords from codeword boundary matching circuit 253 until the codewords can be processed by data processing circuit 263. As an example, decoded data buffer 256 may be a first in, first out memory that provides codewords from codeword boundary matching circuit 253 to data processing circuit 263. Data processing circuit 263 processes the received data and provides read data 203. Where no processing errors are incurred, read data 203 corresponds to the information originally received as write data 201.

Data processing circuit 263 may be any circuit known in the art operable to process encoded data derived from a storage medium in an attempt to recover the original data set that was encoded and written to the storage medium. As an example, data processing circuit 263 may be implemented including a decoder circuit as are known in the art that is operable to reverse the encoding applied by data encoding circuit 213. Such a data decoder circuit may be, but is not limited to an LDPC decoder circuit. Based upon the disclosure provided herein, one of ordinary skill in the art will recognize a myriad of data processing circuits that may be used in relation to different embodiments of the present invention.

Figure 3B:
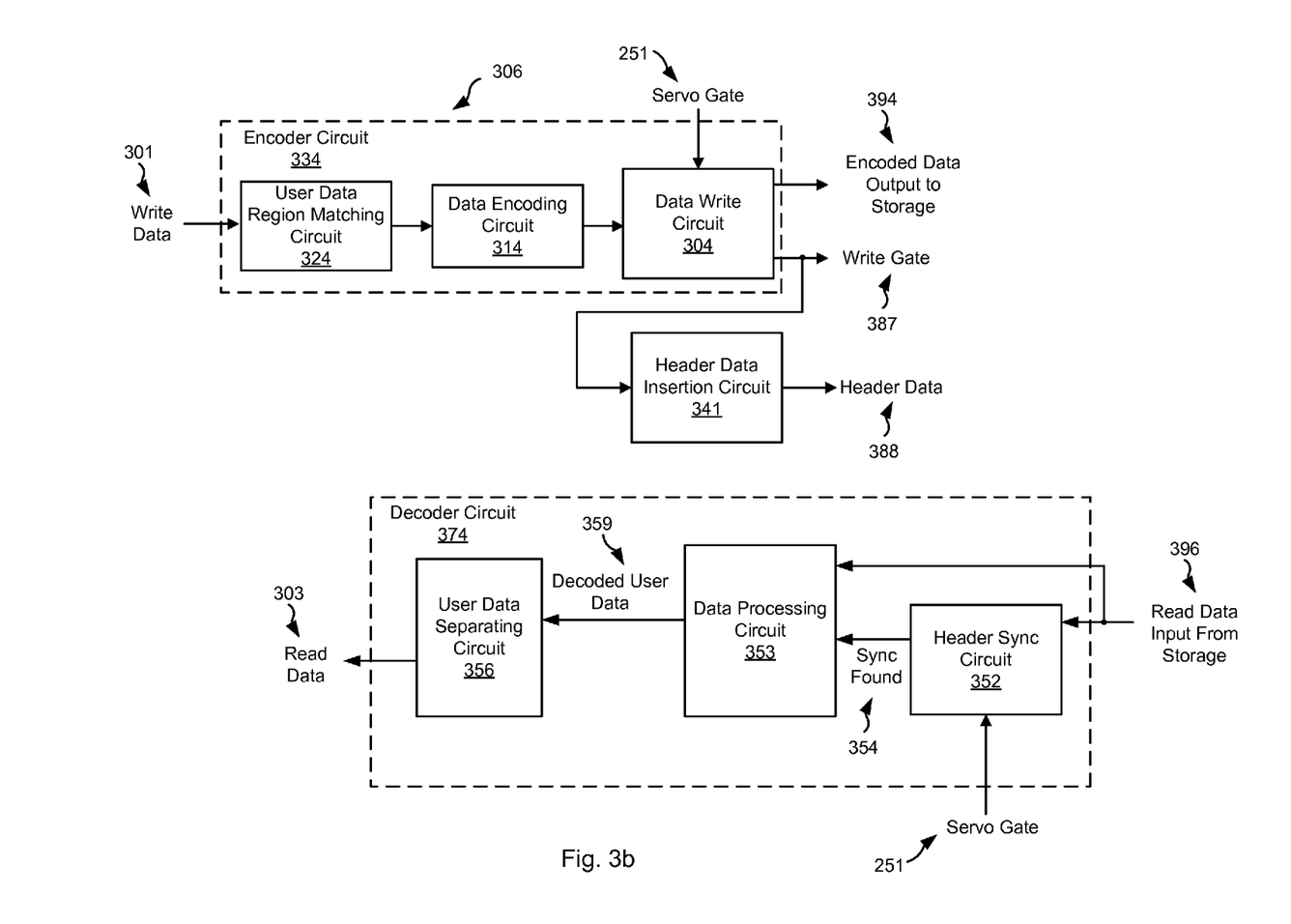
FIG. 3b depicts another read channel circuit operable to read and write concatenated user data sets in accordance with other embodiments of the present invention.

Turning to FIG. 3b, a read channel circuit 306 that is operable to read and write concatenated user data sets (i.e., super sector data sets) is shown in accordance with various embodiments of the present invention. Read channel circuit 306 includes an encoder circuit 334 and a decoder circuit 374. Encoder circuit 334 includes a user data matching circuit 324, a data encoding circuit 314, and a data write circuit 304. Write data 301 is provided to user data region matching circuit 324. Write data 301 may be received from any data source known in the art, and may be received either via a parallel data bus or via a serial data bus as are known in the art. In one particular embodiment of the present invention, write data 301 is received from an upstream processor (not shown). Write data 301 is assembled by user data region matching circuit 324 to include enough data to fill an entire user data region on a storage medium. The amount of user data assembled is approximately equal to the size of the user data region less the number of encoding bits that are applied to the data and the amount of header data that will precede the data on the storage medium. Further, in some cases, the assembled data is interleaved (i.e., shuffled) by user data matching circuit 324 to reduce the impact of any localized noise on the later recovered data set. The assembled and interleaved user data is provided to a data encoding circuit 314 that performs a data encoding on the received user data. The data encoding may be, for example, LDPC encoding as is known in the art. Data encoding circuit 314 provides the encoded data as a super sector data set to a data write circuit 304. Data write circuit 304 receives servo gate 251 from a servo data processing circuit (not shown) that indicates the location of a user data region relative to intervening servo data regions. Once the servo gate 251 is asserted, data write circuit 304 asserts write gate signal 387.

Based upon the assertion of write gate signal 387, a header data insertion circuit 341 begins spooling out header data 388 that will become part of the super sector data set on the storage medium. Once the header data is complete, data write circuit 304 begins writing the encoded data out as encoded data output 394 to the storage medium. Header data 388 and encoded data output 394 is provided to a downstream write circuit (not shown) that is responsible for writing the data to the incorporated storage medium.

Decoder circuit 374 includes a header synchronization circuit 352, a detect/decode circuit 353, and a user data separating circuit 356. Header synchronization circuit 353 receives a read data input 396 derived from the storage medium, and synchronizes to the frequency and phase of the received data stream using the preamble and synchronization information included in the header data associated with the received data. This attempt to synchronize begins when servo gate signal 251 indicates that the servo data region has ended and the user data region has begun. Upon synchronizing to the received data stream, header synchronization circuit 352 asserts a sync found signal 354 indicating that the data received via read data input 396 is valid user data. Header synchronization circuit 352 may be any circuit known in the art that is capable of synchronizing to a data set derived from a user data region of a storage medium, and asserting a data available indicator signal.

Data processing circuit 353 may be any circuit known in the art operable to process encoded data derived from a storage medium in an attempt to recover the original data set that was encoded and written to the storage medium. As an example, data processing circuit 353 may be implemented including a data detector circuit and a data decoder circuit as are known in the art. Such a data detector circuit may be, but is not limited to, a Viterbi algorithm detector circuit. The decoder circuit may be, but is not limited to an LDPC decoder circuit. Based upon the disclosure provided herein, one of ordinary skill in the art will recognize a myriad of data processing circuits that may be used in relation to different embodiments of the present invention. As an example, data processing circuit 353 may be one of the data processing circuits disclosed in U.S. patent application Ser. No. 12/114,462 entitled "Systems and Methods for Queue Based Data Detection and Decoding", and filed May 8, 2008 by Yang et al. The entirety of the aforementioned reference is incorporated herein by reference for all purposes. As another example, data processing circuit 263 may be one of the data processing circuits disclosed in U.S. patent application Ser. No. 12/430,927 entitled "Systems and Methods for Hard Decision Assisted Decoding", and filed Apr. 28, 2009 by Zhong et al. The entirety of the aforementioned reference is incorporated herein by reference for all purposes. As yet another example, data processing circuit 263 may be one of the data processing circuits disclosed in U.S. patent application Ser. No. 11/341,963 entitled "Systems and Methods for Error Reduction Associated with Information Transfer", and filed Jan. 26, 2006 by Song et al. The entirety of the aforementioned reference is incorporated herein by reference for all purposes.

Data processing circuit 353 provides a decoded data set to a user data separation circuit 356. User data separation circuit 356 is operable to receive the decoded data and to perform any de-interleaving that may be required to assemble the data in the form originally provided as write data 301. In some cases, such interleaving is applied by data encoding circuit 314 to limit the effects of any localized noise in the data by interleaving or mixing up the user data. The de-interleaved data is then provided by user data separating circuit 356 as read data 303.

Figure 4A:
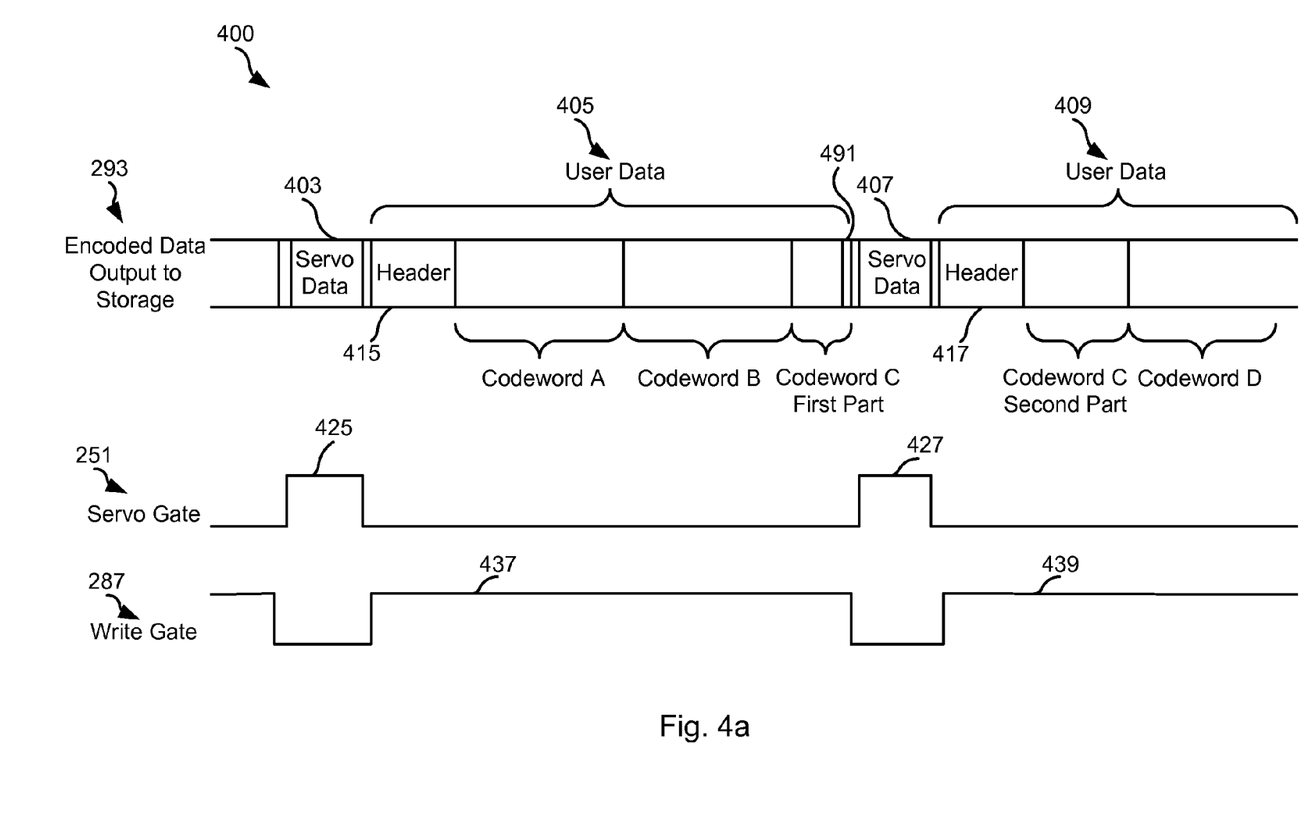
FIG. 4a is a timing diagram depicting an exemplary write operation of the read channel of FIG. 3 in accordance with some embodiments of the present invention.

Turning to FIG. 4a, a timing diagram 400 depicts an exemplary write operation of read channel circuit 205 of FIG. 3 in accordance with some embodiments of the present invention. As shown, encoded data output 293 is a series of data bits corresponding to different regions to be written to a storage medium. In particular, encoded data output 293 is null for a period corresponding to a servo data region 403 that is placed on the storage medium as a reference for where a read/write head assembly exists in relation to the storage medium. During the servo data region 403, servo gate signal 251 is asserted at a level 425 indicating to user data region matching circuit 223 that no data can be written to the storage medium. Once the servo data region 403 completes, servo gate signal 251 de-asserts.

Upon de-assertion of servo gate signal 251, user data region matching circuit 223 asserts write gate signal 287 at a level 437 while at the same time providing a series of data bits corresponding to user data region 405. In particular, user data region matching circuit 223 provides bits corresponding to a header 415. Header 415 may be used to synchronize to the data written in user data region 405. This header may include, for example, a preamble followed by a synchronization pattern as is known in the art. Once user data region matching circuit 223 completes writing header 415, user data region matching circuit 223 writes the next codeword data available from encoded data buffer 219. Where, for example, the user data preceding servo data 403 ended on a codeword boundary, user data region matching circuit 223 begins writing the next codeword. Alternatively, where the user data preceding servo data 403 ended midway through a codeword, user data region matching circuit 223 begins writing at the midway point of the same codeword. Once the current codeword (i.e., codeword A) completes, user data region matching circuit 223 accesses the next code word (i.e., codeword B) from encoded data buffer 219 and provides it in serial as encoded data output 293. Once this codeword (i.e., codeword B) completes, user data region matching circuit 223 begins accessing the next code word (i.e., codeword C) from encoded data buffer 219 and provides a portion of the codeword as encoded data output 293. Some time before the end of user data region 405, user data region matching circuit 223 cuts off the writing of the codeword and subsequently writes a post-amble pattern 491. Such a post-amble pattern indicates the end of the codewords that were written to user data region 405. Once post-amble pattern 491 is written, user data region matching circuit 223 de-asserts write gate signal 287.

After the end of user data region 405, servo gate signal 251 is again asserted corresponding to a servo data region 407 that is placed on the storage medium as a reference for where a read/write head assembly exists in relation to the storage medium. Assertion of servo gate signal 251 at a level 427 indicates to user data region matching circuit 223 that no data can be written to the storage medium. Once the servo data region 407 completes, servo gate signal 251 de-asserts.

Upon de-assertion of servo gate signal 251, user data region matching circuit 223 asserts write gate signal 287 at a level 439 while at the same time providing a series of data bits corresponding to a user data region 409. In particular, user data region matching circuit 223 provides bits corresponding to a header 417. Header 417 may be used to synchronize to the data written in user data region 409. This header may include, for example, a preamble followed by a synchronization pattern as is known in the art. Once user data region matching circuit 223 completes writing header 417, user data region matching circuit 223 writes the remaining portion of codeword C accessed from encoded data buffer 219 as encoded data output 293. User data region matching circuit 223 continues writing this codeword until it completes. Once complete, user data region matching circuit 223 accesses the next codeword (i.e., codeword D) from encoded data buffer 219 and provides it as encoded data output 293 to be written to the storage medium. This process continues until near the end of user data region 409 where another post-amble pattern is written and user data region 409 completes. Of note, such an approach assembles one or more codewords into a super sector data set that is written to a user data region of the storage medium. Of note, use of a common header to synchronize to the super sector data set increases usable bit density of the user data regions.

Figure 4B:
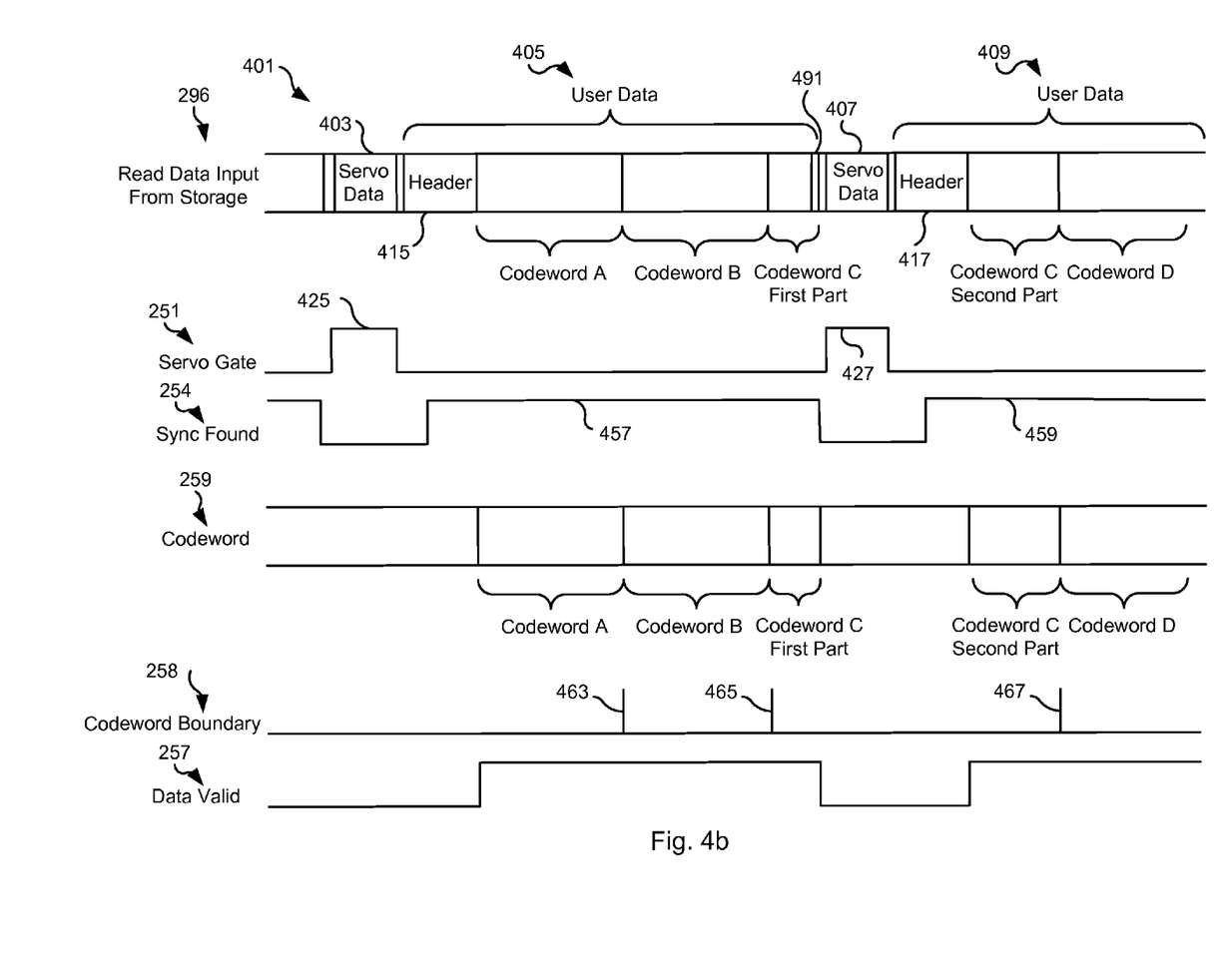
FIG. 4b is a timing diagram depicting an exemplary read operation of the read channel of FIG. 3 in accordance with some embodiments of the present invention.

Turning to FIG. 4b, a timing diagram 401 depicts an exemplary read operation of read channel circuit 205 of FIG. 3 in accordance with some embodiments of the present invention. As shown, read data input 296 is the same series of data bits written to the storage medium in the example of FIG. 4a. In particular, read input 296 includes servo data 403 read from the storage medium and used to determine the location of a read/write head assembly relative to the storage medium. During the servo data region 403, servo gate signal 251 is asserted at level 425 indicating to header synchronization circuit 252 that a header from user data region 405 is soon to follow. As servo gate signal 251 de-asserts, header synchronization circuit 252 begins the process of identifying a preamble pattern and synchronization pattern of header 415. Once header 415 is identified, header synchronization circuit 252 asserts sync found signal 254 at a level 457.

Once the bits associated with header 415 have been received, codeword boundary matching circuit 253 asserts data valid signal 257. With data valid signal 257 asserted, the data bits provided as codeword output 259 are stored to decoded data buffer 256. Codeword boundary matching circuit 253 maintains a count of the number of codeword bits that have been received. This count is continued until the number of remaining bits have been received in accordance with the following equation:

Number of Remaining Bits=Number of Bits in a Codeword−Number of Received Codeword Bits.

For example, where the total number of bits per codeword is four thousand, ninety six bits, and one thousand of the bits were received from a preceding user data region, the number of remaining bits is three thousand, ninety six bits. Alternatively, where the preceding user data region ended on a codeword boundary, the number of received codeword bits is zero, and the number of remaining bits is four thousand, ninety six bits. Once the number of remaining bits of codeword A have been received, codeword boundary matching circuit 253 asserts codeword boundary signal 258 (indicated as 463) indicating the end of codeword A, and the beginning of the next codeword (i.e., codeword B). Codeword B is then provided as codeword output 259 to decoded data buffer 256. This continues until the number of remaining bits of codeword B are received at which time codeword boundary signal 258 (indicated as 465) is asserted indicating the end of the codeword, and the beginning of the next codeword (i.e., codeword C). Codeword C is then provided as codeword output 259 to decoded data buffer 256 until post-amble 491 is identified and data valid signal 257 is de-asserted by codeword boundary matching circuit 253. At this juncture, the number of received codeword bits (the number of bits in codeword C first part) is less than the number of bits in a codeword. Thus, the count will be maintained and continued in the succeeding user data region 409.

Read input 296 includes servo data 407 read from the storage medium and used to determine the location of a read/write head assembly relative to the storage medium. During the servo data region 407, servo gate signal 251 is asserted at level 427 indicating to header synchronization circuit 252 that a header from user data region 409 is soon to follow. As servo gate signal 251 de-asserts, header synchronization circuit 252 begins the process of identifying a preamble pattern and synchronization pattern of header 417. Once header 417 is identified, header synchronization circuit 252 asserts sync found signal 254 at a level 459.

Once the bits associated with header 417 have been received, codeword boundary matching circuit 253 asserts data valid signal 257. With data valid signal 257 asserted, the data bits provided as codeword output 259 are stored to decoded data buffer 256. Codeword boundary matching circuit 253 counts the remaining portion of codeword C (i.e., codeword C second part) at which point codeword boundary matching circuit 253 asserts codeword boundary signal 258 (indicated as 467) indicating the end of codeword C, and the beginning of the next codeword (i.e., codeword D). This process continues until the desired read data is obtained from the storage medium.

Figure 5:
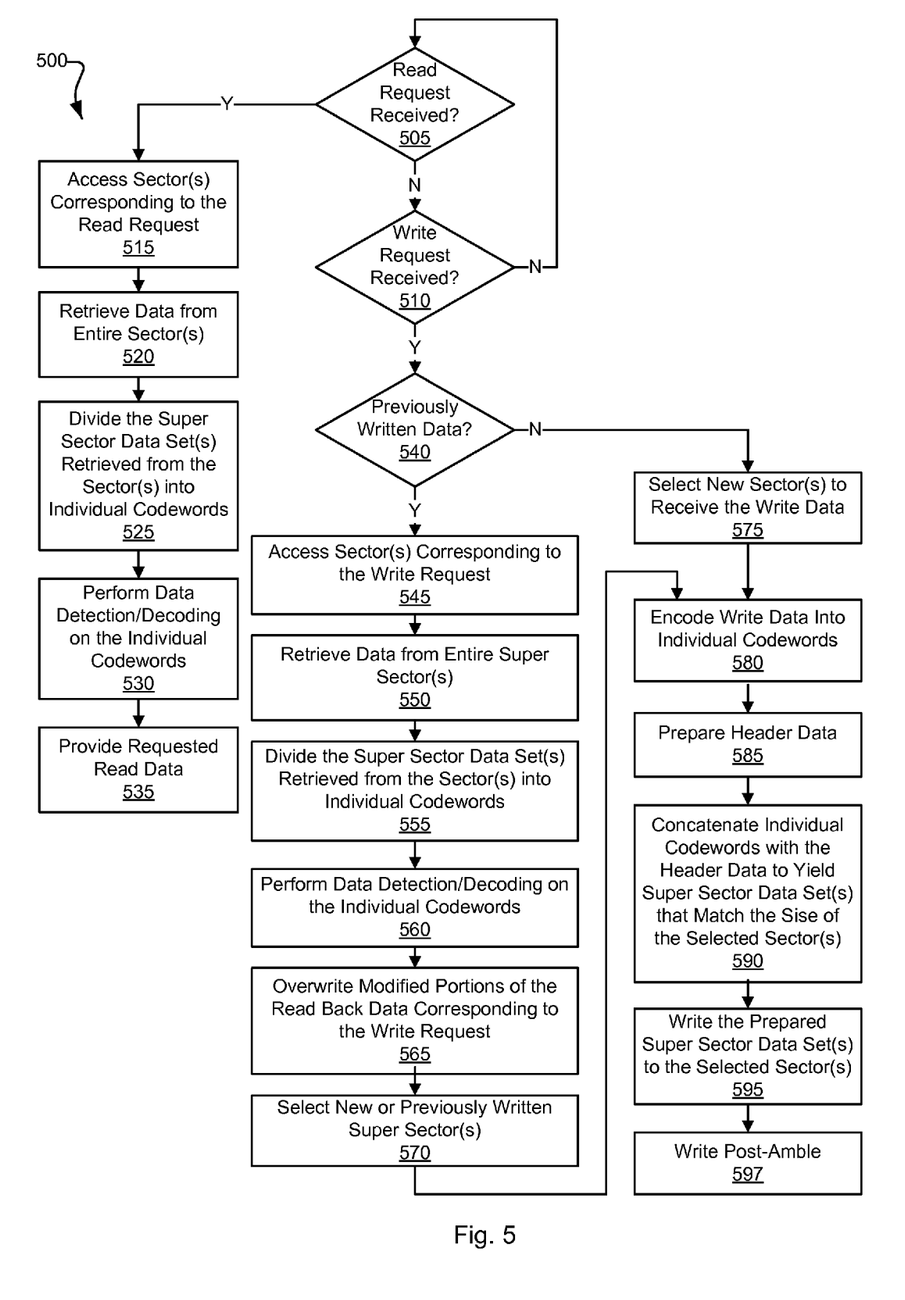
FIG. 5 is a flow diagram showing a method for accessing a storage medium using a concatenated user data set in accordance with some embodiments of the present invention.

Turning to FIG. 5, a flow diagram 500 showing a method for accessing a storage medium using a concatenated user data set in accordance with some embodiments of the present invention. Following flow diagram 500, it is determined whether a read request is received (block 505) or whether a write request is received (block 510). A requesting device or system may be, but is not limited to, a processor. A read request may include an address and/or data range on the storage medium from which data is to be read by a requesting device or system. A write request may indicate an address and include a data set that is to be written to the storage medium. Based upon the disclosure provided herein, one of ordinary skill in the art will recognize a variety of requesting devices or systems that may be used in relation to different embodiments of the present invention, and/or a variety of address and/or data ranges that may be used to identify locations on the storage medium where data is to be read or written.

Where a read request is received (block 505), one or more sectors on the storage medium where the requested data is stored are accessed (block 515), and the corresponding data is retrieved from the sector(s) (block 520). The access and retrieve processes may be any access and retrieve process known in the art. The received data includes super sector data set(s) that are received and divided into individual codewords (block 525). Such division into individual codewords includes synchronizing using a header data and counting the bits received after the end of the header data. A counter is maintained that counts up to the number of bits per codeword. Where a codeword is spread across a sector boundary, the counter continues until the end of the user data region and continues once bits corresponding to the codeword begin being received in the subsequent user data region. As the counter reaches the number of bits per codeword, an indication of a separation between the codewords is asserted, and the next codeword begins to be assembled from the received data. This process continues until all of the codewords from the retrieved data are separated into individual codewords.

The individual codewords are provided to a data processing circuit where the codewords are decoded to recover the data originally encoded to make the codewords (block 530). This processing may include, but is not limited to, one or more iterations through a data detector circuit and a data decoder circuit as is known in the art. In one particular case, the aforementioned data detector circuit is a Viterbi algorithm data detector circuit and the data decoder circuit is an LDPC decoder circuit. Based upon the disclosure provided herein, one of ordinary skill in the art will recognize various data processing circuits that may be used in relation to different embodiments of the present invention. The decoded codewords are then provided to the requesting device or system (block 535).

Alternatively, where a write request is received (block 510), it is determined whether the write request is previously written data (i.e., data from the storage medium that has been read and modified) (block 540). Where the data was not previously written (block 540), a new sector to receive the write data (i.e., an unused sector) is selected (block 575). The write data is encoded into individual codewords (block 580). For example, where a codeword is four thousand, ninety six bits including sixty added encoding bits, four thousand, thirty bits of the write data are encoded to a yield four thousand, ninety six bit codeword. In some embodiments of the present invention, the applied encoding is an LDPC encoding and the added encoding bits are parity bits that are calculated and incorporated in the codeword as is known in the art.

Header data is prepared (block 585). This header data may include a preamble pattern and a synchronization pattern. This header data is used upon a read back to synchronize to the data written to the storage medium. Based upon the disclosure provided herein, one of ordinary skill in the art will recognize a variety of header data that may be used in relation to different embodiments of the present invention.

One or more of the individual codewords are concatenated to the header data to yield a super sector data set (block 590). Where the amount of data to be written is greater than that which can be stored in a single sector, another header data is generated and remaining portions of the data to be written is concatenated to the next header data to yield another super sector data set. The number of header data and codewords that are assembled into super sector data sets is determined based upon the amount of data that is to be written as part of the received write request.

The prepared super sector data set(s) are written to the selected sector(s) (block 595). This may be done using any write process known in the art. In one particular case, this is done by asserting a write gate at a time corresponding to a user data region of a storage medium at which time a read/write head assembly generates a write field in proximity to the storage medium resulting in magnetic information being stored to the storage medium. Based upon the disclosure provided herein, one of ordinary skill in the art will recognize a variety of approaches that may be used to store data to the storage medium. At the end of each super sector data set, a post-amble pattern is written to the storage medium (block 597). This post-amble pattern is used on a read back to identify the end of the user data.

Alternatively, where the data to be written was previously stored to the storage medium (i.e., this write process is part of a read/modify process) (block 540), the sector(s) where the data was originally written are accessed (block 545) and the data from the sectors is retrieved (block 550). The received data includes super sector data set(s) that are received and divided into individual codewords (block 555). Such division into individual codewords includes synchronizing using a header data and counting the bits received after the end of the header data. A counter is maintained that counts up to the number of bits per codeword. Where a codeword is spread across a sector boundary, the counter continues until the end of the user data region and continues once bits corresponding to the codeword begin being received in the subsequent user data region. As the counter reaches the number of bits per codeword, an indication of a separation between the codewords is asserted, and the next codeword begins to be assembled from the received data. This process continues until all of the codewords from the retrieved data are separated into individual codewords. The individual codewords are provided to a data processing circuit where the codewords are decoded to recover the data originally encoded to make the codewords (block 560). This processing may include, but is not limited to, one or more iterations through a data detector circuit and a data decoder circuit as is known in the art.

The original data is then overwritten to match the write data associated with the write request (block 565). This may include, for example, modifying portions of the data that was read back to match the data provided as part of the write request. One or more of the previously written sectors or one or more new sectors are selected to receive the prepared data set (block 570). Once the sector(s) to be written are selected (block 570), the processes of blocks 580 through 597 discussed above are performed to write the modified data back to the storage medium.

In conclusion, the invention provides novel systems, devices, methods, formats and arrangements for data storage. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data decoder circuit, the circuit comprising:
a codeword boundary matching circuit operable to: receive a super sector data set having a first codeword, a second codeword and a common header data; and divide the super sector data set to yield the first codeword and the second codeword, wherein the codeword boundary matching circuit includes a counter operable to count the number of bit periods in the super sector data set and to indicate reception of a complete codeword; and
a data processing circuit operable to apply a decoding algorithm to: the first codeword to yield a first data set, and apply the decoding algorithm to the second codeword to yield a second data set.

2. The data decoder circuit of claim 1, wherein the first data set and the second data set correspond to data originally written to a storage medium.

3. The data decoder circuit of claim 1, wherein the first codeword and the second codeword are low density parity check encoded data, and wherein the data processing circuit includes a low density parity check decoder circuit.

4. The data decoder circuit of claim 1, wherein the circuit further comprises:
a header synchronization circuit operable to: receive the super sector data set; and synchronize to the super sector data set utilizing the common header data.

5. The data decoder circuit of claim 1, wherein the data decoder circuit is implemented as part of a storage device.

6. A data encoder circuit, the circuit comprising:
a data encoding circuit operable to receive write data and to encode the write data into a first codeword and a second codeword;

a user data circuit operable to assemble the first codeword, the second codeword and a header data into a first super sector data set; and wherein the data encoding circuit is further operable to encode the write data into a third codeword, wherein the user data circuit is further operable to include at least a first portion of the third codeword in the first super sector data set, and wherein the user data circuit is further operable to include a second portion of the third codeword into a second super sector data set.

7. The data encoder circuit of claim 6, wherein the data encoding circuit is a low density parity check encoding circuit, wherein the first codeword is a first low density parity check encoded codeword, and wherein the second codeword is a second low density parity check encoded codeword.

8. The data encoder circuit of claim 6, wherein the header data includes a preamble field and a synchronization field.

9. The data encoder circuit of claim 6, wherein the super sector data set includes greater than two times the number of bit periods in the first codeword, and less than the number of bit periods of a user data region of a storage medium.

10. The data encoder circuit of claim 6, wherein the data encoder circuit is implemented as part of a storage device.

11. A data processing circuit, the circuit comprising:
a codeword boundary matching circuit operable to:
receive a super sector data set having a first codeword derived from a storage medium, a second codeword derived from the storage medium and a common header data derived from the storage medium; and
divide the super sector data set to yield the first codeword and the second codeword; and
a data decoding circuit operable to apply a decoding algorithm to:
the first codeword to yield a first data set, and
apply the decoding algorithm to the second codeword to yield a second data set.

12. The circuit of claim 11, wherein the first codeword and the second codeword are low density parity check encoded codewords.

13. The circuit of claim 11, wherein the portion of the first codeword is all of the first codeword, and wherein the portion of the second codeword is less than all of the second codeword.

14. The circuit of claim 11, wherein the circuit further comprises:
an encoder circuit operable to:
receive write data; encode the write data into the first codeword and the second codeword; and
combine the portion of the first codeword with the portion of the second codeword and the common header data to form a super sector data set.

15. The circuit of claim 14, wherein the encoder circuit includes a low density parity check encoder, and wherein the first codeword and the second codeword are low density parity check encoded codewords.

16. The circuit of claim 14, wherein the encoder circuit further includes a user data region matching circuit, and wherein the user data matching circuit is operable to combine the portion of the first codeword with the portion of the second codeword and the common header data into the super sector data set.

17. The circuit of data storage system of claim 14, wherein the super sector data set includes greater than two times the number of bit periods in the first codeword, and less than the number of bit periods of the user data region.

18. The circuit of claim 11, wherein the portion of a first codeword, the portion of a second codeword and the common header data are assembled in a super sector data set, and wherein the data storage system further comprises:
a decoder circuit operable to:
receive the super sector data set;
synchronize to the super sector data set using the common header data;
divide the super sector data set to yield the portion of the first codeword and the portion of the second codeword; and
decode the first codeword and the second codeword to yield an originally written data set.

19. The circuit of claim 18, wherein the decoder circuit includes a low density parity check decoder, and wherein the first codeword and the second codeword are low density parity check encoded codewords.

20. The circuit of claim 11, wherein the user data region is a first user data region, wherein the storage medium further includes a third servo data region separated from the second servo data region by a second user data region, wherein the portion of the second codeword is a first portion of the second codeword, and wherein a second portion of the second codeword is included in the second user data region.

21. The data decoder circuit of claim 11, wherein the data decoder circuit is implemented as part of a storage device.

22. A data encoder circuit, the circuit comprising:
a data encoding circuit operable to receive write data and to encode the write data into a first codeword and a second codeword; and
a user data circuit operable to assemble the first codeword, the second codeword and a header data into a super sector data set, wherein the super sector data set includes greater than two times the number of bit periods in the first codeword, and less than the number of bit periods of a user data region of a storage medium.

23. The data encoder circuit of claim 22, wherein the data encoding circuit is a low density parity check encoding circuit, wherein the first codeword is a first low density parity check encoded codeword, and wherein the second codeword is a second low density parity check encoded codeword.

24. The data encoder circuit of claim 22, wherein the header data includes a preamble field and a synchronization field.

25. The data encoder circuit of claim 22, wherein the super sector data set is a first super sector data set, wherein the data encoding circuit is further operable to encode the write data into a third codeword, wherein the user data circuit is further operable to include at least a first portion of the third codeword in the first super sector data set, and wherein the user data circuit is further operable to include a second portion of the third codeword into a second super sector data set.

26. The data encoder circuit of claim 22, wherein the data encoder circuit is implemented as part of a storage device.

* * * * *